Figure 1:
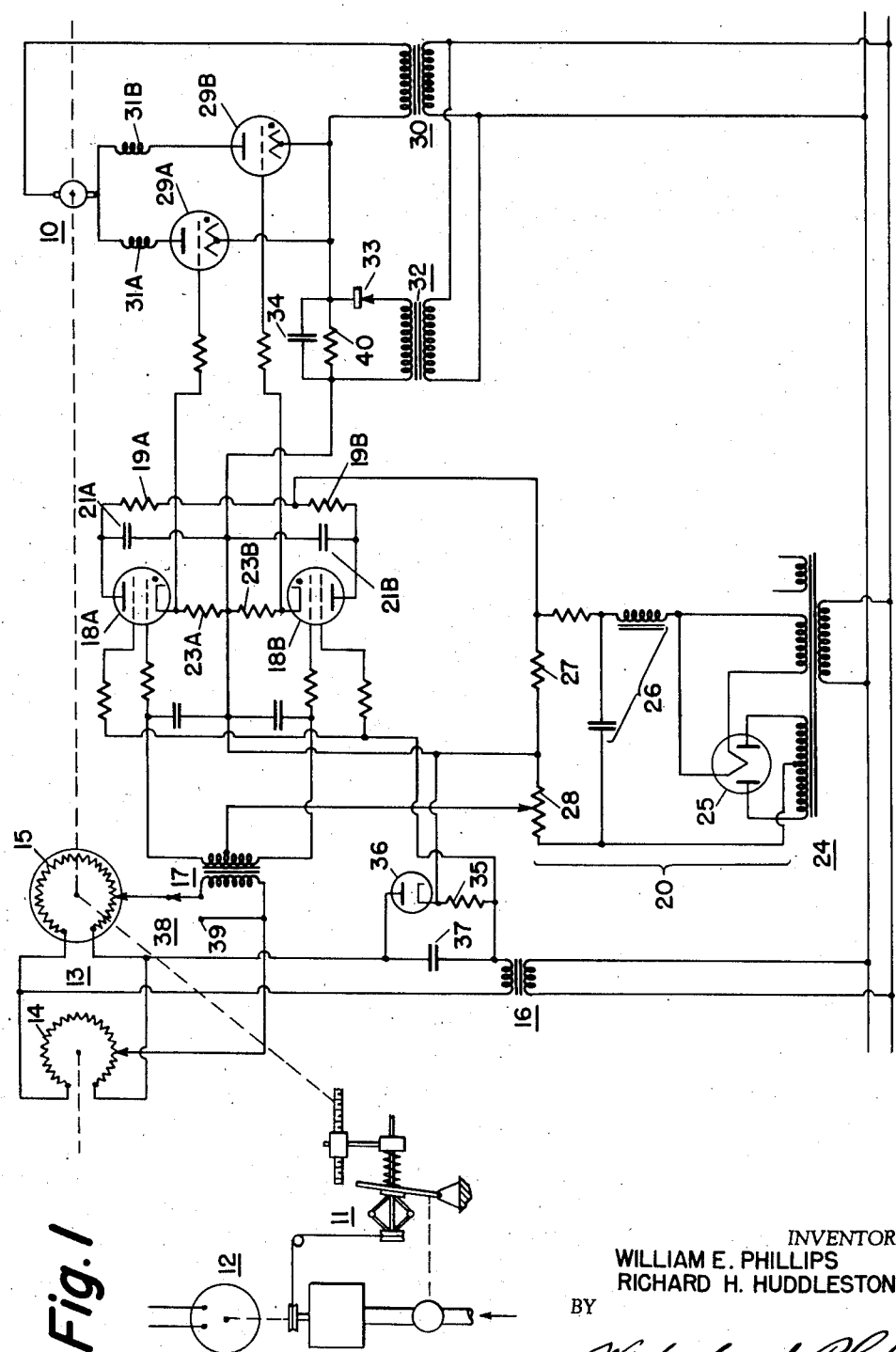

INVENTORS.
WILLIAM E. PHILLIPS
RICHARD H. HUDDLESTON, JR.
BY Woodcock and Phelan
ATTORNEYS.

Nov. 17, 1953         W. E. PHILLIPS ET AL         2,659,850
MOTOR CONTROL SYSTEM AND THE LIKE
Filed March 14, 1950                    2 Sheets-Sheet 2
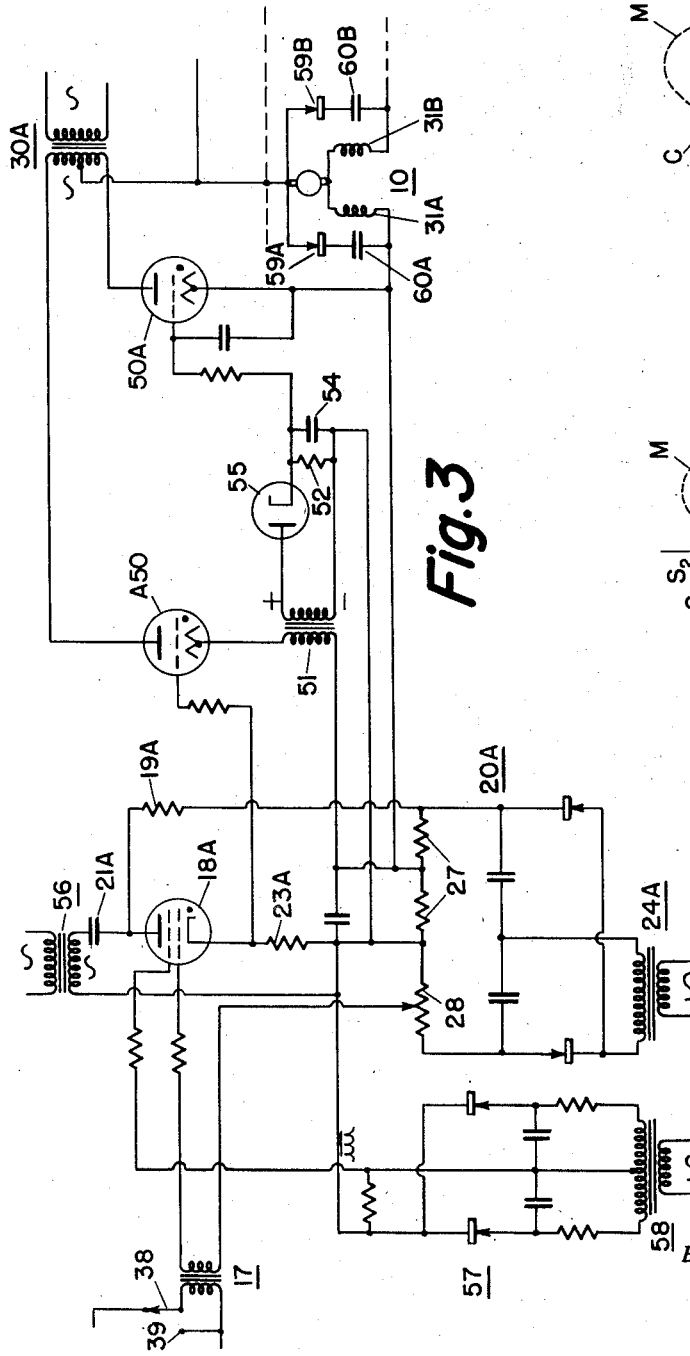
INVENTORS.
WILLIAM E. PHILLIPS
RICHARD H. HUDDLESTON, JR
BY
Woodcock and Phelan
ATTORNEYS Patented Nov. 17, 1953

2,659,850

UNITED STATES PATENT OFFICE 2,659,850

MOTOR CONTROL SYSTEM AND THE LIKE

William E. Phillips, Drexel Hill, and Richard H. Huddleston, Jr., Hatboro, Pa., assignors to Leeds and Northrup Company, Philadelphia, Pa., a corporation of Pennsylvania Application March 14, 1950, Serial No. 149,614

28 Claims. (Cl. 318—257)

This invention relates to arrangements for controlling the repetition frequency or rate of current impulses, particularly the energizing impulses of the motor of a "follow-up" or servo-system, in accordance with an error signal.

In accordance with one aspect of the present invention, current impulses of the same effective value and of variable repetition rate or frequency are produced by varying the operating frequency of a relaxation oscillator in accordance with the magnitude of a control signal and by applying the variable frequency output pulses of the oscillator to fire a gaseous-discharge device always at a fixed point in the cycle of its anode voltage and at intervals determined by the frequency of the oscillator pulses.

More particularly, in accordance with the invention, operation of a motor at an average speed which is substantially proportional to the magnitude of an error signal, with retention of high motor torque even at very low speeds, is obtained by converting the error signal to pulses of repetion frequency which is a function of the magnitude of the signal and by applying the pulses to control the firing of at least one gas-discharge tube or device serving as a switch for the motor-energizing current. For control of a reversible motor, the variable frequency pulses are of fixed polarity but of a phase dependent upon the sense or phase of the error signal and are effective, depending upon their phase, to fire one or the other of discharge tubes respectively in different energizing circuits of the motor. The frequency of the error signal is identical to that of the anode voltage supply for the thyratron switch tube.

Further in accordance with the invention, the conversion of the error signals to pulses of variable frequency is effected by a relaxation oscillator comprising at least one thyratron or similar gas-discharge tube whose anode is supplied with direct current through a network which delays rise of the anode potential after firing of the oscillator tube so to obtain a pulse output the repetition frequency of which is dependent upon the magnitude of the error signal applied to the control grid of the oscillator tube.

Further in accordance with the invention, there is applied to the shield electrode of each oscillator thyratron a pulsating negative biasing voltage so phased with respect to the error signal and to the alternating anode voltage of the corresponding switching thyratron that the oscillator tubes are permitted to fire only within a brief time interval, a few electrical degrees, embracing only peak values of the error signal and early rise of the positive half-waves of the anode voltage of the switching tubes. It is thus insured that the motor-energizing impulses remain constant in both peak and average values throughout a wide range of magnitude of the error signal and are of high value providing substantially maximum motor torque during the impulse period regardless of motor speed.

Further in accordance with the invention and in a preferred form, each winding of the motor is in the common cathode circuit of a pair of thyratrons, or equivalent, whose anode circuits are connected in push-pull to an alternating-current source. Preferably, and more specifically, an error signal of proper phase effects firing of one of the thyratrons of the pair, and firing of the other thyratron of the pair is effected by a voltage derived from firing of the first thyratron.

The invention further resides in systems having the features of novelty and utility hereinafter described and claimed.

For a more detailed understanding of the invention, reference is made to the accompanying drawings, in which:

Fig. 1 schematically illustrates one embodiment of the invention as utilized for control of a governor motor of a generating unit;

Fig. 2 is an explanatory figure referred to in discussion of a feature of the system of Fig. 1;

Fig. 3 schematically illustrates another and preferred embodiment of the invention; and Fig. 4 is an explanatory figure referred to in discussion of Fig. 3.

By way of example, the motor 10 of Fig. 1 may be used to vary the setting of the governor 11 of a generating unit 12 in accordance with an error signal corresponding with the deviations of tie-line load, system frequency, or other variable of a system of electrical power distribution. In the particular arrangement shown in Fig. 1, the balanceable network 13 includes an impedance 14 which is adjusted by a suitable metering instrument in accordance with the deviations to be controlled. The rebalancing slidewire 15 is suitably coupled to the follow-up or servo-motor 10 for rebalancing of network 13 concurrently with adjustment of the input control member of generating unit 12. The network 13 is supplied with alternating-current from a transformer 16 so that when the network is unbalanced, there appears across the secondary winding of signal transformer 17 an alternating voltage whose magnitude depends upon the extent of unbalance of network 13 and whose phase depends upon the sense of the unbalance. The signal or error voltage is applied in push-pull to the control grids of the gaseous discharge tubes 18A, 18B which may be small thyratrons such as of the 2D21 type. The anodes of the thyratrons are connected respectively through the resistors 19A, 19B to the positive terminal of a suitable direct-current source 20. The anodes of the thyratrons are also connected to a more negative terminal of the D. C. source 20 through condensers 21A and 21B respectively. Thus, after firing of either thyratron, its anode voltage slowly rises at rate determined by the time constant of the associated delay network 19A, 21A or 19B, 21B and the magnitude of the anode potential source. Upon firing of either thyratron 18A or 18B, the corresponding condenser 21A or 21B discharges through the tube and its associated cathode resistor 23A or 23B which also serves as a coupling to the control structure or grid of the associated switching tube 29A or 29B. The discharge current through (and resulting voltage drop across) the resistors 23A, 23B is of large peak value and short duration as determined by the magnitude of the voltage change on capacitors 21A, 21B and the time constant of the discharge path.

In the particular arrangement shown in Fig. 1, the direct-current source 20 comprises a transformer 24 having a secondary winding connected to the anodes of a full-wave rectifier 25. The resulting full-wave rectified current is smoothed by a filter 26 and the total potential drop of the system is impressed upon a voltage-divider network including resistors 27, 28. The resistor 28 is preferably a potentiometer adjustable to provied a selected unidirectional negative bias for the grids of the thyratrons 18A, 18B.

The anode current of the higher-power thyratrons 29A, 29B which may be of the FG27A type is supplied from an alternating-current course exemplified by transformer 30. The cathodes of the tubes 29A, 29B are connected to one terminal of the secondary of transformer 30, and the anodes of tubes 29A, 29B are connected to the other terminal of the secondary winding. The windings 31A and 31B of motor 10 are respectively included in the anode circuits of the tubes 29A, 29B so that one or the other of these windings is energized depending upon which of the tubes 29A, 29B is fired. The transformer 32, rectifier 33, resistor 40 and capacitor 34 provide a continuous fixed direct-current bias for the control grids of the motor-switching thyratrons 29A, 29B.

With the control network 13 in balance, the error signal is of null or zero value and consequently there is no firing of either of the oscillator thyratrons 18A, 18B. Therefore, neither thyratron 29A nor 29B fires and the motor 10 remains at rest. When the control network 13 is unbalanced in either sense, there is applied to the oscillator-thyratrons 18A, 18B an error signal of phase dependent upon the sense of unbalance of network 13. Consequently, one or the other of the oscillator tubes 18A, 18B fires to produce across the corresponding cathode resistor 23A or 23B a sharp pulse which causes firing of the associated motor-switching thyratron 29A or 29B. Consequently, one or the other of the motor windings 31A, 31B is energized, and the motor 10 rotates in a direction dependent upon the phase of the error signal so to adjust the input-control member of governor 11, or other control device, until balance of the network 13 is restored by the rebalancing adjustment of the slidewire 15.

The repetition rate of the pulses produced across the resistors 23A or 23B depends upon the magnitude of the error signal because after either tube 18A or 18B is fired, the rise of its anode voltage is delayed by the associated delay network 19A, 21A or 19B, 21B. The maximum obtainable firing rate corresponds with the frequency of the source which supplies the transformers 30 and 16, for example 60 cycles. To insure proportionality throughout the range of magnitude of error signal, the time constant should not be less than that providing for rise of the anode voltage of the oscillator tubes 18A, 18B to firing magnitude, after firing, within the time corresponding with one cycle of the supply source for the switching thyratrons 29A, 29B. This affords the maximum obtainable motor speed. If a lower maximum speed is satisfactory or desired for a particular system, the time constant of the delay network may be correspondingly increased. For maximum obtainable firing rate in a typical system, the resistors 19A and 19B may each be 100,000 ohms and the associated condensers 21A and 21B may each be of 2 microfarads' capacity. It is characteristic of the 2D21 thyratrons and like tubes that as the grid voltage increases, less anode voltage is required for firing of the tube. As the signal or grid voltage increases, the required anode voltage will be decreased and the capacitor can charge up to this required lower voltage in less time and consequently the frequency of firing will increase. Hence the arrangement provides for varying the frequency of pulses, as derived from resistors 23A or 23B, in proportion to the magnitude of the signal or error voltage. In brief, for a large error signal of given pulse, one of the tubes 29A will fire for every half-wave of the power frequency, whereas for signal voltages of smaller magnitude, the tubes will fire at fewer number of half-waves per second with corresponding decrease in speed of motor 10. The repetition frequency of the firing pulses produced by the oscillator and impressed upon the switching tubes is a step function of the magnitude of the error voltage.

Specifically, assuming the error-signal frequency to be 60 cycles per second, the maximum obtainable pulse repetition frequency is 60 per second at maximum magnitude of the error signal and for progressively lower magnitude of the error signal, the pulse repetition rate progressively decreases by an integral number of cycles of the motor supply source frequency and at low signals may be one every two or more seconds.

The desired proportionality between the speed of motor 10 and the magnitude of the error signal is insured by a feature now described. Referring to Fig. 2, the curve A represents the minimum grid voltage for firing of a 2D21 tube and the curves $S_1$ and $S_2$ respectively represent small and large error voltages. For the moment it is to be considered that the shield voltage is zero and that the tube is biased so that the minimum firing voltage at full plate voltage is represented by line A. The relative phase of the error voltage and the anode voltage of the associated motor thyratron 29A or 29B is such that the signal voltage leads by 90°. With the signal voltage of large magnitude indicated by the solid curve as $S_2$, the oscillator thyratron would fire at point X and, consequently, the pulse which appears across the output resistor 23A or 23B would occur at a time when the anode voltage of the associated motor thyratron 29A or 29B is negative and consequently the motor-switching thyratron would not fire. However, for a small signal voltage as represented by the broken line curve S₁, the signal voltage despite its smaller magnitude would cause the oscillator thyratron 18A or 18B to fire at point Y where the anode voltage of the associated motor thyratron 29A or 29B is positive. Consequently, the motor thyratron would conduct at the lower signal voltage but not at the higher.

To overcome this difficulty, there is applied to the shield grid of each of the tubes 18A, 18B a half-wave pulsating direct-current voltage derived from the same source as the firing signal and the anode voltage of the switching tubes 29A, 29B so that the timing of all these three voltages is fixed with respect to each other. The preferred relationship between the shield voltage (represented by curve B), the error or signal voltage (as represented by either of curves S₁, S₂) and the anode voltage of tubes 29A, 29B (represented by curve M) is shown in Fig. 2. The capacitor 37 in series with the resistance bridge 13 serves as a phase-shifting network insuring that the shield voltage and the error signal are in 90° phase relationship with respect to each other.

The significant point is there is no possibility of firing either oscillator thyratron, even with maximum possible grid signal, until the shield voltage has advanced to a point only a few electrical degrees from its zero value. In short if either of the oscillator thyratrons is going to fire at all, it must fire within the narrow region Z for which the shield voltage closely approaches zero. Since, as shown in Fig. 2, the anode voltage of the motor thyratron starts to rise in a positive direction in this region, it will conduct for essentially a full half-cycle any time it does conduct. Thus, each impulse to the motor 10 is of constant value which results in full torque at any speed of impulsing.

In the arrangement shown in Fig. 1, the pulsating shield voltage is obtained from resistor 35 connected in series with a rectifier tube 36 across a phase-shifting condenser 37 which provides for supply of alternating-current to the network 13. When the rectifier 36 is conducting, the shield, in a typical arrangement, is driven approximately 100 volts negative, as represented by the peaks of curves B. Since 16 volts on the shield of a 2D21 tube will offset approximately 100 volts of grid signal, there is no possibility of firing the tube even at maximum grid signal except within the narrow region Z. As in the modification shown in Fig. 3, adjustment of resistor 28 to set the proper biasing voltage for the oscillator is effected with the contact of the shorting test switch 38 in engagement with contact 39 to apply zero signal voltage to transformer 17. After the bias is properly set, the contact of test switch 38 is returned to the position shown in Figs. 1 and 3.

In the modification shown in Fig. 3, like that of Fig. 1, the error voltage output of transformer 17 is converted into pulses of repetition frequency corresponding with the magnitude of the error signal and of phase corresponding with the sense of the error signal. Unlike the modification of Fig. 1, however, that of Fig. 3 provides for full-wave rectification of the anode current of the motor-switching tubes. In the modified circuit, there are two additional thyratron tubes respectively in circuit with motor-windings 31A, 31B. As the two motor-energizing circuits are identical, only one of them is shown. Specifically, the motor-winding 31A may be supplied with current by a pair of motor-switching thyratrons A50 and 50A. These tubes are triggered 180° out of phase so that both halves of the current supplied by the transformer 30A are effective for energization of winding 31A. The first of these motor-energizing thyratrons, specifically tube A50, is fired by the output pulses from the associated relaxation oscillator tube 18A. The second tube, 50A, of the pair is fired by deriving from the anode-cathode current of the first tube, A50, a voltage which positively biases the grid of the second tube 50A. This positive voltage must persist until the plate of the second tube turns positive, that is, within the next half-wave of the same cycle. In fact, as later described, this positive biasing voltage may persist on the control grid of the second tube 50A for several cycles after the first tube has stopped firing.

The circuit for deriving the firing voltage for the second tube 50A may comprise a transformer 51, resistor 52, a capacitor 54 and a rectifier tube 55. When the first motor-switching thyratron A50 fires, the resulting cathode current causes a voltage pulse to be induced in the secondary of transformer 51 with polarity as indicated. The rectifier 55 permits the voltage to produce flow of current into the integrating circuit consisting of the resistor 52 and capacitor 54. The constants of this network are so chosen that for any pulse of the first thyratron A50 there is always at least sufficient voltage across the network 52, 54 to fire the second tube 50A in the next half-cycle. The high back-resistance of the rectifier 55 prevents the capacitor 54 from discharging through the low resistance path afforded by the secondary winding of transformer 51. By selection of the values of resistor 52 and condenser 54, it is possible to have the thyratron 50A fire twice for each pulse of thyratron A50 at the lower motor speeds or lower magnitudes of the signal. At the lower speeds, the effective impedance of the motor is lower with consequent higher current pulses in the cathode circuit of tube A50 with correspondingly enhanced integrated grid voltage for tube 50A.

At lower rates of firing of the thyratron where the average torque is at lowest value, if the motor should stall, the current in the thyratron A50 increases many times above the value normal for the same firing rates. The integrating circuit 52, 54 after a few cycles will, through its integrating action, maintain a higher positive grid voltage of thyratron 50A and cause it to conduct on alternate half-cycles despite the low error signal. This aumotatically increases the motor torque several hundred per cent and permits the motor to overcome the static friction preventing its rotation. When the motor starts to rotate, the firing of the second tube 50A returns to a lower rate corresponding with the magnitude of the error signal.

As in Fig. 1, the biasing voltage for the oscillator is selected by adjustment of resistor 28 while the movable contact of the shorting test switch 38 is in engagement with contact 39 to provide zero output of signal transformer 17; however, it was found that, in absence of a feature hereinafter discussed, the thyratron 18A, instead of consistently firing at point V, Fig. 4, would fire erratically, i. e., sometimes at V and sometimes at W; and would sometimes lock in at point W. When the tube 18A fires at point W, the associated motor-switching tube A50 does not conduct since its plate voltage is then negative; moreover, after firing at point W, the direct-current anode voltage of tube 18A does not rise sufficiently high to fire at point V for at least several cycles. Irregular or improper timing of the firing also existed because of the circumstance that the shield voltage may not go to zero and the closeness to which it approaches zero depends on the characteristics of the rectifiers which supply the shield voltage. Thus, firing at the improper point W may occur because the shield voltage at point W may be less negative than it is at point V. Thus, it was not possible to set the bias to a value insuring proper motor-control action for low error-signals.

To overcome this difficulty, there is superimposed upon the direct-current voltage supplied to the anode of tube 18A an alternating-current voltage properly phased with respect to the anode voltages of thyratron A50, 50A represented in Fig. 4 by the curve C. Such alternating current voltage is provided by power transformer 56 whose secondary terminals are respectively connected to the anode of tube 18A through condenser 21A and to the cathode of tube 18A through the cathode-coupling resistor 23A. Under this condition, the anode voltage of the oscillator tube 18A will always be more positive at point V than at point W so to offset any normal difference in the shield voltage and cause the oscillator tube to fire at point V if it fires at all. The bias on the tube 18A can thus be adjusted in normal manner and the visual indication of conduction by tube A50 utilized as a guide in setting the bias.

Furthermore, in the system of Fig. 3, the shield-grid voltage has been changed to full-wave rectification as indicated by the curves B, B' in order that each oscillator tube 18A, 18B can fire only at the point V and cannot fire ahead or behind this point, as generally discussed in connection with Fig. 2. This application of a full-wave rectified voltage to the shield further narrows the permissible firing zone of each of the relaxation oscillator tubes.

In the particular arrangement shown in Fig. 3, the polarizing voltage for the shield of tube 18A is derived from a full-wave rectifier network 57 of known type connected to a source of alternating-current exemplified by the transformer 58. The direct-current anode voltage for tube 18A is derived from rectifier network 20A energized from transformer 24A corresponding respectively with network 20 and transformer 24 of Fig. 1. Also, as in Fig. 1, resistor 27 and potentiometer 28 serve as a potential divider for derivation of an adjustable grid-biasing voltage for the oscillator thyratron 18A.

The rectifier 59A and capacitor 60A in shunt to the motor are to suppress the voltage surges produced by collapse of the magnetic field of winding 31A in the intervals between successive energizing impulses.

As above indicated, the foregoing description of Fig. 3 is limited to control of the energization of winding 31A of motor 10: energization of the other winding 31B of the motor is similarly controlled by a pair of discharge tubes corresponding with tubes A50, 50A, in turn controlled by a relaxation oscillation network, similar to 18A, 19A, 21A, receiving the error-signal voltage from an input transformer corresponding to transformer 17, the primary windings of the transformers being in parallel. Rectifier 59B and capacitor 60B, similar to rectifier 59A and capacitor 60A, suppress voltage surges produced by collapse of the magnetic field of motor winding 31B in the intervals between its successive energizations.

When the current impulses of frequency controlled by the relaxation oscillator are for energization, for example, of a vibrator solenoid, of a furnace heater, the load of a power rectifier, of a stitch-welder or other translating device or apparatus which does not, like motor 10, require two channels for discrimination of sense of an error signal, the control system of Figs. 1 and 3 may be simplified since only one channel is required and, for such purposes the control signal may be either alternating or direct-current. On the other hand, if the translating device or load requires multi-phase energization, the number of channels will be correspondingly increased.

It shall be understood the invention is not limited to the specific exemplary embodiments described and illustrated and that changes and modifications may be made within the scope of the appended claims.

What is claimed is:

1. An arrangement for variably controlling the speed of a motor energized from an alternating-current source of fixed frequency in accordance with an error signal which comprises a relaxation oscillator, biasing means precluding operation of said oscillator for zero magnitude of said error signal, means for applying the error signal to said oscillator and in cooperation with said biasing means controlling said oscillator to produce pulses of the same effective value and of repetition frequency corresponding with the magnitude of the error signal, gaseous-discharge means in circuit with said motor and said source of alternating-current of fixed frequency, and circuit connections for applying said variable frequency pulses to control electrode structure of said gaseous-discharge means.

2. An arrangement as in claim 1 in which the relaxation oscillator comprises a thyratron having a direct-current source of anode voltage and delay network having a fixed time constant for delaying rise of the anode voltage after firing for an interval not substantially exceeding one cycle of the frequency of said motor energizing source.

3. An arrangement as in claim 2 in which the thyratron has a shield electrode to which a pulsating negative bias is intermittently applied in such fixed time relation to the alternating anode voltage of the gaseous-discharge means that said pulses occur only for positive half-waves of said anode voltage.

4. An arrangement as in claim 3 in which the negative bias is provided by a half-wave rectifier phased to apply negative-biasing pulses during negative half-waves of the anode voltage of the gaseous-discharge means to preclude firing thereof except during the positive half-waves of said anode voltage.

5. An arrangement as in claim 3 in which the negative bias pulses are provided by a full-wave rectifier phased to preclude firing of the thyratron except within a few degrees of rise of the positive half-waves of the anode voltage of said gaseous-discharge means.

6. An arrangement as in claim 2 in which an alternating voltage of the same frequency as said motor energizing source is superimposed upon the slowly-rising anode voltage derived from said delay network.

7. An arrangement as in claim 1 in which firing of the gaseous-discharge means produces unidirectional current impulses which are integrated to control a second gaseous-discharge means in circuit with said motor and source for enhanced motor torque.

8. An arrangement for controlling the speed and direction of rotation of a reversible motor energized from an alternating-current source of fixed frequency in accordance with the magnitude and sense of an error signal of the same frequency as said motor energizing source comprising a relaxation oscillator system to which said error signal is applied to produce pulses whose phase relative to said alternating-current source corresponds with the sense of the error signal, which are of the same effective value for all finite magnitudes of the error signal and which are of frequency corresponding with the magnitude of the error signal, biasing means precluding operation of said oscillator for zero magnitude of said error signal, oppositely-poled gaseous-discharge devices in circuit with said source of alternating current and respectively in circuit with windings of said motor, and circuit connections for applying said pulses to said gaseous-discharge devices for selective energization of said motor windings, in dependence upon the phasing of said pulses, by unidirectional current impulses of substantially fixed value and of frequency dependent upon the repetition frequency of said pulses.

9. An arrangement as in claim 8 in which the relaxation oscillator system comprises push-pull thyratrons, each having a delay network having a fixed time constant in its anode-cathode circuit for slow rise, after firing, of its anode voltage within the next cycle of the motor energizing source.

10. An arrangement as in claim 8 in which the oscillator system includes a thyratron having a shield electrode to which negative biasing pulses are applied in phase and in fixed time relation to the alternating voltage applied to the anodes of the gaseous-discharge means.

11. An arrangement as in claim 10 in which the negative bias is provided by a half-wave rectifier phased to apply negative-biasing pulses to the shield electrode during negative half-waves of the anode voltage applied to said gaseous-discharge devices.

12. An arrangement as in claim 8 in which the oscillator system includes a thyratron having a shield electrode and in which negative bias pulses for the shield electrode are provided by a full-wave rectifier phased to preclude firing of the thyratron except within a few degrees of rise of the positive half-waves of the anode voltage of the corresponding gaseous-discharge means.

13. An arrangement as in claim 9 in which an alternating voltage of the same frequency as said source is superimposed upon the unidirectional anode voltage for each thyratron derived from its associated delay network.

14. An arrangement as in claim 8 in which an integrating network is associated with each gaseous-discharge device for integration of its pulses to control a second gaseous-discharge means in circuit with said motor for full-wave excitation of the corresponding winding.

15. An arrangement as in claim 14 in which the constants of the integrating networks each charge means at higher frequency than the provide for firing of the second gaseous-discpulse frequency at lower values thereof.

16. An arrangement for controlling energization of a motor winding comprising a pair of gaseous-discharge tubes, means for energizing the anode-cathode circuits of said tubes in push-pull, connections for including said motor winding in the common cathode circuit of said tubes, means for applying firing impulses to the grid of the first of said tubes, and means included in the anode-cathode circuit of said first of said tubes for deriving from its anode current a firing voltage applied to the grid of the second of said tubes.

17. An arrangement as in claim 16 in which the last named means includes a rectifier and an integrating network.

18. An arrangement as in claim 16 for controlling each of two windings of a reversible motor with a common means for applying the firing impulses to the first tubes of the pairs of tubes, the polarity of said firing impulses determining which of said pairs of tubes supplies current to the motor.

19. An arrangement as in claim 18 in which the frequency of the firing impulses is variable to control speed of the motor.

20. A relaxation oscillator for producing pulses of the same effective magnitude and of variable frequency comprising a thyratron having a shield electrode and a control grid, a resistor-capacitor network in the anode-cathode circuit of said thyratron for delaying rise of its anode voltage after firing, coupling means in the shield electrode circuit for applying a pulsating negative voltage of fixed frequency to said shield electrode of said thyratron, and coupling means in the control grid circuit for applying to said grid of said thyratron a control voltage of the same frequency as said shield voltage and of magnitude adjustable to vary the firing rate of said thyratron.

21. A variable frequency relaxation oscillator as in claim 20 in combination with a gaseous-discharge tube whose anode circuit includes a source of alternating-current and a load device, the anode voltage of said tube and said shield voltage being phased for arrival of the shield voltage at zero value a few electrical degrees after arrival of the anode voltage at its zero value and said control voltage being alternatng and substantially 90° out of phase with respect to said anode voltage.

22. An arrangement for producing current impulses of equal effective value and of variable repetition rate which comprises means for applying an alternating voltage of fixed frequency to the anode of a gaseous-discharge device, and means for applying to the grid of said device positive pulses always occurring at a fixed point in the cycle of said alternating voltage and with timing between successive pulses corresponding with any predetermined number of cycles of said alternating voltage.

23. An arrangement for producing current impulses of equal effective value and of variable repetition rate which comprises a gaseous discharge device having an anode and a grid, a source of alternating voltage of fixed frequency in the anode circuit of said gaseous discharge device, and a source of positive voltage pulses included in the grid circuit of said gaseous discharge device timed to apply said positive pulses to said grid always at a fixed point in the cycle of the alternating anode voltage and with the timing between successive pulses corresponding with any predetermined number of cycles of said alternating anode voltage.

24. An arrangement for controlling a variable speed, reversible motor energized from an alternating-current source of fixed frequency in accordance with the magnitude and sense of an error signal of the same fixed frequency as said motor-energizing source, which arrangement is characterized by high torque throughout the range of speed control comprising a pair of oppositely-poled gaseous discharge devices in circuit with said source and said motor for rotation of said motor in one direction or the other in dependence upon which of said devices is fired, and a pair of relaxation oscillators whose pulse outputs respectively effect firing of said devices, the input circuits of said oscillators being connected for operation of one or the other of said oscillators in dependence upon the sense of said error signal, and the anode circuits of said oscillators each including a delay network whose time constant provides for rise of the oscillator anode voltage to refiring magnitude in an interval not substantially exceeding one cycle of said source frequency whereby the repetition rate of pulses provided by the operating oscillator, the firing rate of the associated discharge device and the speed of the motor is a step function of the magnitude of the error signal.

25. An arrangement as in claim 24 in which each relaxation oscillator comprises a thyratron having a shield electrode, and in which there is applied to such shield electrode a pulsating negative bias phased with respect to the anode voltage of the associated gaseous discharge device to preclude generation of an output pulse by said oscillator except for positive half-waves of said anode voltage.

26. An arrangement as in claim 24 in which the negative bias for said shield electrodes is provided by a half-wave rectifier phased to apply negative-biasing pulses during negative half-waves of the anode voltage.

27. An arrangement as in claim 24 in which there are additionally included a second pair of gaseous discharge devices in circuit with said motor and each having an input circuit in which current impulses produced upon firing of one of said first pair of gaseous discharge devices is integrated to effect firing of the associated one of said second pair of gaseous discharge devices to obtain enhanced motor torque.

28. An arrangement as in claim 27 in which each relaxation oscillator comprises a thyratron having a shield electrode, and in which there is applied to such shield electrode negative bias pulses provided by a full-wave rectifier phased to preclude firing of the thyratron except within a few degrees of rise of the positive half-waves of the associated gaseous discharge device of said first pair thereof.

WILLIAM E. PHILLIPS.
RICHARD H. HUDDLESTON, Jr.

References Cited in the file of this patent

UNITED STATES PATENTS

| Number | Name | Date |
|---|---|---|
| 1,934,400 | Bollman | Nov. 7, 1933 |
| 2,305,581 | Homrighous | Dec. 15, 1942 |
| 2,360,857 | Eldredge | Oct. 5, 1944 |
| 2,445,233 | Montgomery | July 13, 1948 |
| 2,495,390 | Shimek | Jan. 24, 1950 |
| 2,569,697 | Semm et al. | Oct. 2, 1951 |
| 2,575,961 | Ivans | Nov. 20, 1951 |